(12) United States Patent
Hamabe et al.

(10) Patent No.: US 12,305,026 B2
(45) Date of Patent: May 20, 2025

(54) COMPOSITE RESIN MOLDED ARTICLE

(71) Applicant: Panasonic Corporation, Osaka (JP)

(72) Inventors: Masashi Hamabe, Osaka (JP);
Toshifumi Nagino, Osaka (JP);
Masayoshi Imanishi, Osaka (JP);
Shouma Nishino, Osaka (JP)

(73) Assignee: Panasonic Corporation, Osaka (JP)

( * ) Notice: Subject to any disclaimer, the term of this patent is extended or adjusted under 35 U.S.C. 154(b) by 536 days.

(21) Appl. No.: 16/532,675

(22) Filed: Aug. 6, 2019

(65) Prior Publication Data

US 2020/0062940 A1 Feb. 27, 2020

(30) Foreign Application Priority Data

Aug. 24, 2018 (JP) .................. 2018-157633

(51) Int. Cl.
*C08L 23/12* (2006.01)
*C08K 13/04* (2006.01)

(52) U.S. Cl.
CPC ........... *C08L 23/12* (2013.01); *C08L 2205/16* (2013.01)

(58) Field of Classification Search
CPC ...... C08L 23/06; C08L 23/12; C08L 2205/16; C08K 7/02; C08K 2201/014; C08K 2201/016
See application file for complete search history.

(56) References Cited

U.S. PATENT DOCUMENTS

| | | | | |
|---|---|---|---|---|
| 4,552,805 | A * | 11/1985 | Fish, Jr. .................. | B29C 70/10 428/297.4 |
| 8,974,634 | B2 * | 3/2015 | Yano ........................ | D21D 1/34 162/57 |
| 2006/0084729 | A1 * | 4/2006 | Clarke .................... | C08L 23/02 524/35 |
| 2009/0042045 | A1 | 2/2009 | Takimoto et al. | |
| 2013/0202882 | A1 | 8/2013 | Uchida et al. | |
| 2015/0376373 | A1 | 12/2015 | Shoji et al. | |
| 2018/0201770 | A1 * | 7/2018 | Hamabe ................... | C08J 5/045 |
| 2018/0230290 | A1 * | 8/2018 | Saga ........................ | C08L 81/06 |
| 2018/0311870 | A1 * | 11/2018 | Nagino ............... | B29C 45/0001 |

FOREIGN PATENT DOCUMENTS

| | | | |
|---|---|---|---|
| CN | 1648293 | A * | 8/2005 |
| EP | 476926 | A2 * | 3/1992 |
| EP | 3 447 085 | | 2/2019 |
| JP | 61069848 | A * | 4/1986 |
| JP | 2001-89578 | | 4/2001 |
| JP | 3500403 | | 2/2004 |
| WO | 2018/123150 | | 7/2018 |

OTHER PUBLICATIONS

Mirbagheri et al; Journal of Applied Polymer Science; published May 2007 (Year: 2007).*
Lee et al; Composites Science and Technology; 60(2000), 209-217 (Year: 2000).*
Machine translation into English of JP 61-069848A; Nomura et al; Apr. 1986 (Year: 1986).*
Engineering Tool Box; Beech Wood Flour Density; Feb. 2010 (Year: 2010).*
Akil et al; Materials and Design; vol. 32; pp. 4107-4121 (Year: 2011).*
Extended European Search Report issued Jan. 24, 2020 in corresponding European Patent Application No. 19193415.7.
Database WPI Week 201850 Thomson Scientific, London, GB; AN 2018-525283 XP-2796858.
Notification of Reasons for Refusal issued Mar. 22, 2022 in corresponding Japanese Patent Application No. 2018-157633, with English language translation.
Office Action and Search Report issued Nov. 10, 2022 in Chinese Patent Application No. 201910757041.8, with English-language translation.
Office Action issued Apr. 20, 2023 in related U.S. Appl. No. 17/953,645.
Office Action issued Jun. 1, 2023 in corresponding Chinese patent application No. 201910757041.8, with Machine English Translation.
Office Action issued Feb. 10, 2025 in U.S. Appl. No. 18/396,081.

* cited by examiner

*Primary Examiner* — Karuna P Reddy
(74) *Attorney, Agent, or Firm* — Wenderoth, Lind & Ponack, L.L.P.

(57) ABSTRACT

A composite resin molded article includes: a base resin; and fillers dispersed in the base resin, wherein the fillers include fibrous fillers and particulate fillers having aspect ratios lower than aspect ratios of the fibrous fillers.

7 Claims, 3 Drawing Sheets

Fig. 4

| | FILLER | | | | | BASE RESIN | COMPOSITE RESIN MOLDED PRODUCT | | PROPERTY OF MOLDED ARTICLE | | | |
|---|---|---|---|---|---|---|---|---|---|---|---|---|
| KIND | RATIO OF FIBROUS FILLERS HAVING ASPECT RATIOS 10 OR HIGHER | RATIO OF PARTICULATE FILLER HAVING ASPECT RATIOS 2 OR LOWER | COLOR DIFFERENCE L VALUE | DEFIBRATED PART AT THE END PART | | KIND | RATIO OF FIBROUS FILLER IN THE FILLER | L VALUE AT SURFACE SIDE AND CORE SIDE | ELASTIC MODULUS GPa | RESULT OF DROP TEST | COLORABILITY | APPEARANCE |
| EXAMPLE 1 | CELLULOSE (CONIFER) | 5 – 10% | 50 – 60% | 90 | HAVING | | PP | SURFACE SIDE ≥ CORE SIDE | SURFACE SIDE ≥ CORE SIDE | 2.2GPa GOOD | GOOD | GOOD | GOOD |
| EXAMPLE 2 | CELLULOSE (CONIFER) | 5 – 10% | 60 – 70% | 90 | HAVING | | PP | SURFACE SIDE ≥ CORE SIDE | SURFACE SIDE ≥ CORE SIDE | 2.1GPa GOOD | GOOD | GOOD | GOOD |
| EXAMPLE 3 | CELLULOSE (CONIFER) | 1 – 5% | 50 – 60% | 90 | HAVING | | PP | SURFACE SIDE ≥ CORE SIDE | SURFACE SIDE ≥ CORE SIDE | 2.1GPa GOOD | GOOD | GOOD | GOOD |
| COMP-EXAMPLE 1 | CELLULOSE (CONIFER) | 15 – 30% | 35 – 45% | 90 | HAVING | | PP | SURFACE SIDE ≥ CORE SIDE | SURFACE SIDE ≥ CORE SIDE | 2.3GPa GOOD | BAD | GOOD | BAD |
| COMP-EXAMPLE 2 | CELLULOSE (CONIFER) | 1 – 5% | 75 – 85% | 90 | HAVING | | PP | SURFACE SIDE ≥ CORE SIDE | SURFACE SIDE ≥ CORE SIDE | 1.8GPa MIDDLING | GOOD | GOOD | GOOD |
| COMP-EXAMPLE 3 | CELLULOSE (CONIFER) | 80 – 90% | 0 – 5% | 90 | HAVING | | PP | SURFACE SIDE ≥ CORE SIDE | SURFACE SIDE ≥ CORE SIDE | 2.5GPa GOOD | BAD | GOOD | BAD |
| COMP-EXAMPLE 4 | CELLULOSE (CONIFER) | 0% | 80 – 90% | 90 | HAVING | | PP | SURFACE SIDE ≥ CORE SIDE | SURFACE SIDE ≥ CORE SIDE | 1.6GPa BAD | GOOD | GOOD | GOOD |
| COMP-EXAMPLE 5 | CELLULOSE (CONIFER) | 5 – 10% | 50 – 60% | 90 | HAVING | | PP | CORE SIDE ≥ SURFACE SIDE | SURFACE SIDE ≥ CORE SIDE | 2.0GPa MIDDLING | MIDDLING | GOOD | MIDDLING |
| COMP-EXAMPLE 6 | CELLULOSE (CONIFER) | 5 – 10% | 50 – 60% | 70 | HAVING | | PP | SURFACE SIDE ≥ CORE SIDE | SURFACE SIDE ≥ CORE SIDE | 2.3GPa GOOD | GOOD | BAD | MIDDLING |
| COMP-EXAMPLE 7 | CELLULOSE (CONIFER) | 5 – 10% | 50~60% | 80 | HAVING | | PP | SURFACE SIDE ≥ CORE SIDE | CORE SIDE ≥ SURFACE SIDE | 2.3GPa GOOD | GOOD | MIDDLING | MIDDLING |
| COMP-EXAMPLE 8 | CELLULOSE (CONIFER) | 5~10% | 50~60% | 90 | NONE | | PP | SURFACE SIDE ≥ CORE SIDE | SURFACE SIDE ≥ CORE SIDE | 2.0GPa MIDDLING | MIDDLING | GOOD | GOOD |

COMPOSITE RESIN MOLDED ARTICLE

CROSS-REFERENCE TO RELATED APPLICATIONS

This application claims priority of Japanese Patent Application No. 2018-157633 filed on Aug. 24, 2018, the contents of which is incorporated herein by reference.

BACKGROUND

1. Technical Field

The present disclosure relates to a composite resin molded article which makes it possible to achieve a molded article excellent in mechanical properties.

2. Related Art

So-called "general-purpose plastics" such as polyethylene (PE), polypropylene (PP), polystyrene (PS), polyvinyl chloride (PVC) are not only considerably inexpensive but also easy to form, and has a weight as low as a small fraction of a weight of a metal or a ceramic. For this reason, the general-purpose plastics are often used as materials for various livingwares such as bags, various packages, various containers and sheets, and also as materials for industrial components such as automotive components and electrical components, daily commodities, miscellaneous goods and the like.

However, the general-purpose plastics have drawbacks such as insufficient mechanical strength. For this reason, the general-purpose plastics do not have sufficient properties required for materials used for various industrial products including machine products such as automobiles, and electric/electronic/information products, and the current state is that the application range of the general-purpose plastics is restricted.

On the other hand, so-called "engineering plastics" such as polycarbonate, fluorine resin, acrylic resin and polyamide are excellent in mechanical properties, and are used for various industrial products including machine products such as automobiles, and electric/electronic/information products. However, the engineering plastics have problems such as high price, difficulty in monomer recycling, and high environmental load.

Thus, it is demanded to significantly improve the material properties (mechanical strength and the like) of the general-purpose plastics. There is known a technology to improve a mechanical strength of a general-purpose plastic by dispersing a natural filler, a glass fiber, a carbon fiber or the like as a fibrous filler in a resin of the general-purpose plastic for the purpose of strengthening the general-purpose plastic. Also there is known a technology to improve a mechanical strength of a general-purpose plastic by dispersing an inorganic powder such as talc and silica, a cellulose-based powder such as pulp powder, waste paper powder and wood chips, or the like as a particulate filler in a resin of the general-purpose plastic. Above all, organic fillers such as cellulose have attracted attention as reinforcing materials because of inexpensiveness and excellent environmental properties in disposal.

Various companies have proceeded with studying in order to improve the mechanical strength of the general-purpose plastics. In Japanese Patent No. 3500403, as shown in FIG. 5, a cellulose-based powder 53 which passes through a 10 mesh having an aspect ratio of 2 or higher and does not pass through a 60 mesh is added to a resin 51 to enhance an impact strength.

SUMMARY

In Japanese Patent No. 3500403, the cellulose-based powder 53 which passes through a 10 to 60 mesh i.e. a mesh with an opening width of 300 μm to 1.6 mm is used to provide a composite resin having a high impact strength and an excellent appearance. As shown in FIG. 5, the composite resin has a low elastic modulus because the filler is composed of only the powder. Although the elastic modulus is improved by making the filler fibrous, there has been a problem that the impact strength is lowered and therefore it is difficult to achieve both the elastic modulus and the impact strength. Moreover, there has been a problem that aggregates of the filler are increased by adding the fibrous filler, and therefore the appearance is impaired.

One non-limiting and exemplary embodiment provides a composite resin molded article having a high elastic modulus, a high impact resistance, and a good appearance.

In one general aspect, the techniques disclosed here feature: a composite resin molded article includes:
 a base resin; and
 fillers dispersed in the base resin
  wherein the fillers include fibrous fillers, and particulate fillers having aspect ratios lower than aspect ratios of the fibrous fillers.

The composite resin molded article according to the present disclosure makes it possible to achieve a composite resin molded article having a high elastic modulus and a high impact resistance and excellent in appearance.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

The present disclosure will become readily understood from the following description of non-limiting and exemplary embodiments thereof made with reference to the accompanying drawings, in which like parts are designated by like reference numeral and in which:

FIG. 4 is a table showing measurement results in examples 1 to 3 and comparative examples 1 to 8.

DETAILED DESCRIPTION

Hereinafter, a composite resin molded article according to the embodiment will be described with reference to the drawings. In the following description, for the same constituents, the same symbols are provided, and the explanation for the identical constituent is appropriately omitted.

First Embodiment

Figure 1:
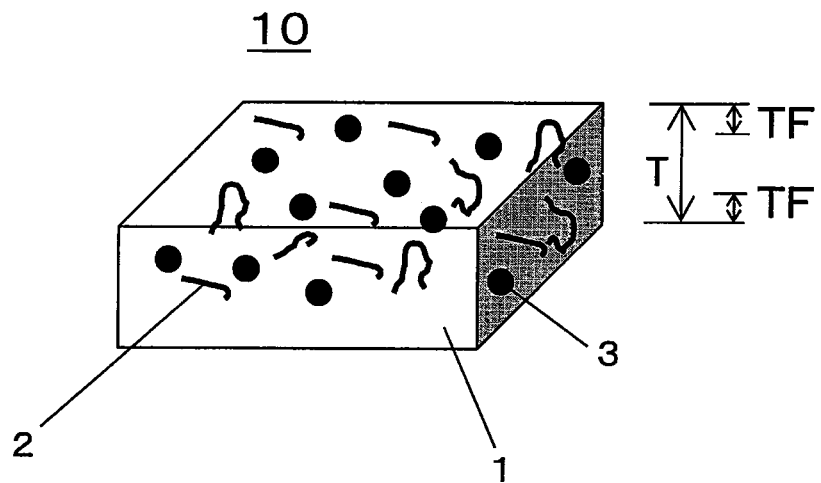
FIG. 1 is a schematic sectional drawing of a composite resin molded article in a first embodiment.
Figure 2A:
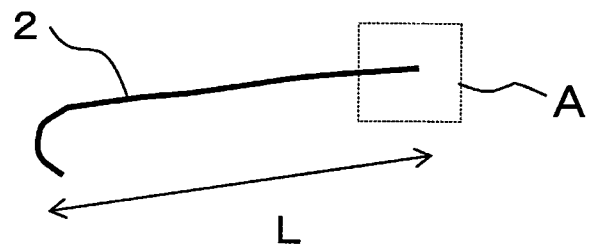
FIG. 2A is a schematic drawing of a fibrous filler in the first embodiment.
Figure 2B:
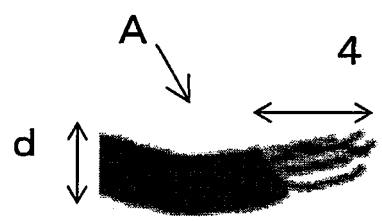
FIG. 2B is a partial enlarged view of an end part of the fibrous filler in FIG. 2A.

FIG. 1 is the schematic sectional drawing of the composite resin molded article 10 according to a first embodiment. FIG. 2A is the schematic drawing of a fibrous filler 2 in the first embodiment. FIG. 2B is the partial enlarged view of the end part A of the fibrous filler 2 in FIG. 2A.

The composite resin molded article in the first embodiment is made of a melt-kneaded material containing a base resin, fillers and a dispersant. The fillers include fibrous fillers and particulate fillers. In the composite resin molded article, the fibrous fillers 2 having a high aspect ratio and the particulate fillers 3 having a low aspect ratio are dispersed in a base resin 1, as shown in the schematic sectional drawing of FIG. 1

In the first embodiment, the base resin 1 is preferably a thermoplastic resin for securing good moldability. Examples of the thermoplastic resin include an olefin-based resin (including a cyclic olefin-based resin), a styrene-based resin, a (meth)acrylic resin, an organic acid vinyl ester-based resin or a derivative thereof, a vinyl ether-based resin, a halogen-containing resin, a polycarbonate-based resin, a polyester-based resin, a polyamide-based resin, a thermoplastic polyurethane resin, a polysulfone-based resin (polyether sulfone, polysulfone, etc.), a polyphenylene ether-based resin (a polymer of 2,6-xylenol, etc.), a cellulose derivative (cellulose esters, cellulose carbamates, cellulose ethers, etc.), a silicone resin (polydimethylsiloxane, polymethylphenylsiloxane, etc.), rubber or elastomer (a diene-based rubber such as polybutadiene and polyisoprene, a styrene-butadiene copolymer, an acrylonitrile-butadiene copolymer, an acrylic rubber, an urethane rubber, a silicone rubber, etc.), and the like. The resins described above may be used alone or in combination. Note that the base resin 1 is not limited to the aforementioned materials as long as the base resin 1 is thermoplastic.

Among these thermoplastic resins, the olefin-based resin having a relatively low melting point is preferable as the base resin 1. The olefin-based resin includes not only a homopolymer of an olefin-based monomer but also a copolymer of olefin-based monomers and a copolymer of an olefin-based monomer and another copolymerizable monomer. Examples of the olefin-based monomer include acyclic olefins (an α-C2-20 olefin such as ethylene, propylene, 1-butene, isobutene, 1-pentene, 4-methyl-1-pentene, and 1-octene), cyclic olefins, and the like. These olefin-based monomers may be used alone or in combination. Among the olefin-based monomers, the acyclic olefins such as ethylene and propylene are preferable. Examples of other copolymerizable monomers include a fatty acid vinyl ester such as vinyl acetate and vinyl propionate; a (meth)acrylic monomer such as (meth)acrylic acid, alkyl (meth)acrylate and glycidyl (meth)acrylate; an unsaturated dicarboxylic acid such as maleic acid, fumaric acid and maleic anhydride, or an anhydride thereof; a vinyl carboxylate (e.g. vinyl acetate, vinyl propionate, etc.); a cyclic olefin such as norbornene and cyclopentadiene; a diene such as butadiene and isoprene, and the like. These copolymerizable monomers may be used alone or in combination. Specific examples of the olefin-based resin include copolymers of acyclic olefins (especially α-C2-4 olefin) such as a polyethylene (low density, medium density, high density or linear low density polyethylene, etc.), a polypropylene, an ethylene-propylene copolymer, and a ternary copolymer such as ethylene-propylene-butene-1, and the like.

Next, the dispersant will be described. The composite resin molded article in the present embodiment may contain a dispersant for the purpose of improving adhesiveness among the fibrous fillers 2, the particulate fillers 3 and the base resin 1, dispersibility of the fibrous fillers 2 and the particulate fillers 3 in the base resin 1, or the like. Examples of the dispersant include various titanate-based coupling agents, silane coupling agents, a modified polyolefin grafted with an unsaturated carboxylic acid, a maleic acid, a maleic anhydride or an anhydride thereof, a fatty acid, a fatty acid metal salt, a fatty acid ester, and the like. Preferably, the silane coupling agent is of an unsaturated hydrocarbon type or an epoxy type. The dispersant has no problem even if the surface of the dispersant is modified by treatment with a thermosetting or thermoplastic polymer component. In the present embodiment, a content of the dispersant in the composite resin molded article is preferably 0.01% by mass to 20% by mass, more preferably 0.1% by mass to 10% by mass, and even more preferably 0.5% by mass to 5% by mass. When the content of the dispersant is less than 0.01% by mass, the dispersion is impaired, meanwhile when the content of the dispersant is more than 20% by mass, the strength of the composite resin molded article is lowered. The dispersant is appropriately selected depending on the combination of the base resin 1, the fibrous fillers 2 and the particulate fillers 3, and may not be added in the case that the dispersant is not required.

Next, the fibrous fillers 2 and the particulate fillers 3 will be explained. In the particulate fillers 3, the material is basically the same as that of the fibrous fillers 2, and only the aspect ratio is different from that of the fibrous fillers 2. Thus, in the following description, the fibrous fillers 2 will be explained in detail. In the present embodiment, the fibrous fillers 2 (hereinafter simply referred to as "fiber" in some cases) contained in the composite resin molded article is used mainly for the purpose of improving a mechanical property, improving a dimensional stability by decreasing a linear expansion coefficient, or the like, in the resin molded article molded using the composite resin molded article. For this purpose, the fibrous fillers 2 preferably have an elastic modulus higher than of the base resin 1, and specific examples of the fibrous fillers 2 include a carbon fiber (carbonous fiber), a carbon nanotube, pulp, cellulose, a cellulose nanofiber, lignocellulose, a lignocellulose nanofiber, a basic magnesium sulfate fiber (magnesium oxysulfate fiber), a potassium titanate fiber, an aluminum borate fiber, a calcium silicate fiber, a calcium carbonate fiber, a silicon carbide fiber, wollastonite, xonotlite, various metal fibers, a natural fiber such as cotton, silk, wool and hemp, a jute fiber, a regenerated fiber such as rayon and cupra, a semisynthetic fiber such as acetate and promix, a synthetic fiber such as polyester, polyacrylonitrile, polyamide, aramid and polyolefin, as well as a modified fiber obtained by chemically modifying a surface and a terminal of any of the aforementioned fibers, and the like. Above all, the carbons and celluloses are particularly preferable from the viewpoints of availability, high elastic modulus, and low linear expansion coefficient. Furthermore, the cellulose natural fibers are preferable from the viewpoint of environmental properties.

Shapes of the fibrous fillers 2 and the particulate fillers 3 will be explained. The symbol L represents a length of the fibrous filler 2 or the particulate filler 3 (hereinafter referred to as "fiber length" in some cases), and the symbol d represents a width of the fibrous filler 2 or the particulate filler 3 (hereinafter, referred to as "fiber diameter" in some cases). In relation to the fibrous fillers 2 and the particulate fillers 3, when a content of the fibers having a high aspect ratio (L/d) is large i.e. when a content of the fibrous fillers 2 is large, the elastic modulus is improved. The aspect ratios of the fibrous fillers 2 are preferably 10 or higher. However, when the content of the fibers having high aspect ratios is large, the impact resistance is deteriorated, furthermore the fiber aggregates increase, and the appearance is impaired. On the other hand, when the content of the fibers having low aspect ratios is large i.e. when the content of the particulate fillers 3 is large, the impact resistance is improved, the fiber aggregates decrease, and also the appearance is good. The aspect ratios of the particulate fillers 3 are preferably 2 or lower. However, when the content of the fibers having low aspect ratios is large, the elastic modulus is lowered.

The relationship between the aspect ratio and the elastic modulus will be described. When the composite resin molded article is loaded with stress, if there are fibers having high aspect ratios, the composite resin is not distorted because the resin stretches but the high rigidity fibers hardly stretch. Thereby, the elastic modulus is improved. On the other hand, in the case of the fibers having low aspect ratios, a distortion-suppressing effect of the fibers is reduced when loaded with the stress, the composite resin is distorted, and the elastic modulus is lowered.

The relationship between the aspect ratio and the impact resistance will be described. When the composite resin molded article is loaded with impact, if there are fibers having high aspect ratios, the fibers cannot follow elongation of the resin, so that a crack is generated between the resin and the fiber, and the crack as a starting point leads to breakage. On the other hand, in the case of the fibers having low aspect ratios, the fibers follow elongation of the resin owing to the fine fibers when loaded with the impact, so that a crack is hardly generated, and the composite resin molded article is hard to break.

The relationship between the aspect ratio and the appearance will be described. The fibers having high aspect ratios i.e. the fibrous fillers and the fibers having low aspect ratios i.e. the particulate fillers are kneaded together, so that the fibers having low aspect ratios i.e. the particulate fillers are inserted between the fibers having high aspect ratios i.e. the fibrous fillers, aggregation is suppressed, and the appearance is improved.

As described above, it is preferable that the fibers having high aspect ratios (fibrous fillers) and the fibers having low aspect ratios (particulate fillers) are mixed in the composite resin molded article from the viewpoints of the elastic modulus, the impact resistance, and the appearance. Simulation calculates what relation of the mixing ratio of each fiber improves the property. It is preferable that an abundance ratio of fibers having aspect ratios of 10 or higher is 1% to 10%, and an abundance ratio of fibers having aspect ratios of 2 or lower is 50% to 70%. In other words, it is preferable that a ratio of the fibrous fillers in the fillers is 1% to 10%, and a ratio of the particulate fillers in the fillers is 50% to 70%.

In addition, an abundance ratio of other fibers having aspect ratios of higher than 2 and lower than 10 is 20% to 49%.

In addition, the aforementioned abundance ratio refers to a ratio of each number of the fibrous fillers, the particulate fillers and the other fillers in the total number of the fillers.

Hereinbefore, the state of the mixed fibers having different aspect ratios has been described, and hereinafter the state of the fibers existing in the composite resin molded article will be described. As described above, it has been described that the fibers having high aspect ratios (fibrous fillers) increases the elastic modulus, and the fibers having low aspect ratios (particulate fillers) improves the impact resistance. In view of the composite resin molded article, a large number of fibers having high aspect ratios of 10 or higher may be charged at the surface layer of the composite resin molded article, and fibers having low aspect ratios of 2 or lower may be charged at the core side of the composite resin molded article. In this case, since the elastic modulus at the surface layer side is high, a rigidity of the entire composite resin molded article is increased, and the impact can be absorbed at the core side of the composite resin molded article on the impact loading, and also the impact resistance is improved. For this reason, it is preferable that a large number of fibers having high aspect ratios of 10 or higher are charged at the surface layer of the composite resin molded article, and fibers having low aspect ratios of 2 or lower are charged at the core side of the composite resin molded article. Herein, as shown in FIG. 1, when a thickness of the composite resin molded article 10 is represented by T and a distance from the surface of the composite resin molded article 10 is represented by TF, the "surface layer of composite resin molded article" refers to a part where e.g. TF≤0.2×T is satisfied. In addition, the "core side of composite resin molded article" refers to a part where e.g. TF>0.2×T is satisfied. Note that the "surface layer of composite resin molded article" is present at both the front side and the back side of the composite resin molded article 10, as shown in FIG. 1.

When a composite resin pellet is applied to a part to be colored in a plurality of colors including white, such as white goods, colorability is required for the fibrous filler composite resin. Whiteness of the composite resin molded article should be maintained for providing colorability for the composite resin molded article, and thus whiteness of fibers to be added should be maintained. Lightness of L value determined by a color difference measurement of the fiber is preferably high. Lightness of L value of the fiber for improving a coloring degree of the composite resin molded article has been experimentally calculated, and the L value is preferably higher than 80, more preferably 85 or higher.

States of the fibers in the composite resin molded article will be described. The whiteness at the surface layer side of the composite resin molded article is preferably high for improving the colorability for the composite resin molded article. Thus, the composite resin molded article has lightness of different L values determined by the color difference measurement in the cross-sectional direction, and it is preferable that lightness of the L value at the surface layer side is higher than lightness of the L value at the core side.

For further improving the mechanical properties, specific surface areas of the fibers are preferably large because a larger bonded interface between the fibers and the base resin leads to improvement of the elastic modulus. For increasing the specific surface areas of the fibers, a structure that at least one end part A in the fiber length direction is partially defibrated in one fiber as shown in FIG. 2A and FIG. 2B is most preferable. In FIG. 2B, the symbol 4 represents the defibrated part. The optimum shape of the fiber is calculated from experiments and simulation results as follows. Preferably, the defibrated part 4 has a length of 5% to 50% of the fiber length L of the entire fibrous filler 2. If the length of the defibrated part 4 is less than 5% of the total fiber length L, the elastic modulus is not improved because of the small specific surface area, and if the length of the defibrated part 4 is not less than 50% of the total fiber length L, the defibrated part 4 having a high aspect ratio is dominant, therefore the fibers are easy to orientate during injection molding, and the impact strength is decreased.

Next, the characteristics of the fibrous fillers 2 will be explained. The types of the base resin 1 and the fibrous fillers 2 are as described above, but if the fibrous fillers 2 are too soft relative to the base resin 1 i.e. the elastic modulus is low, the entire composite resin molded article has a low elastic modulus, and as a result, the strength is lowered. On the other hand, if the fibrous fillers 2 are too hard relative to the base resin 1 i.e. the elastic modulus is high, a shock wave caused by impact does not propagate but is absorbed at the interface between the base resin 1 and the fibrous fillers 2, therefore cracks and crazes are easily caused near the interface, and as a result, the impact resistance is lowered. As for the relationship of the elastic modulus between the base resin 1 and the fibrous fillers 2, the elastic modulus of the fibrous fillers 2 is higher, and the difference therebetween is preferably made as small as possible. The optimal relationship is calculated from the simulation results, and the difference in the elastic modulus between the base resin 1 and the fibrous fillers 2 is preferably not more than 20 GPa.

In addition, for these fibrous fillers 2, a filler having a surface treated with various titanate-based coupling agents, silane coupling agents, a modified polyolefin grafted with an unsaturated carboxylic acid, a maleic acid, a maleic anhydride or an anhydride thereof, a fatty acid, a fatty acid metal salt, a fatty acid ester, or the like may be used for the purpose of improving the adhesiveness with the base resin 1 or the dispersibility in the composite resin molded article. Alternatively, a filler having a surface treated with a thermosetting or thermoplastic polymer component may be used with no problem.

Figure 3:
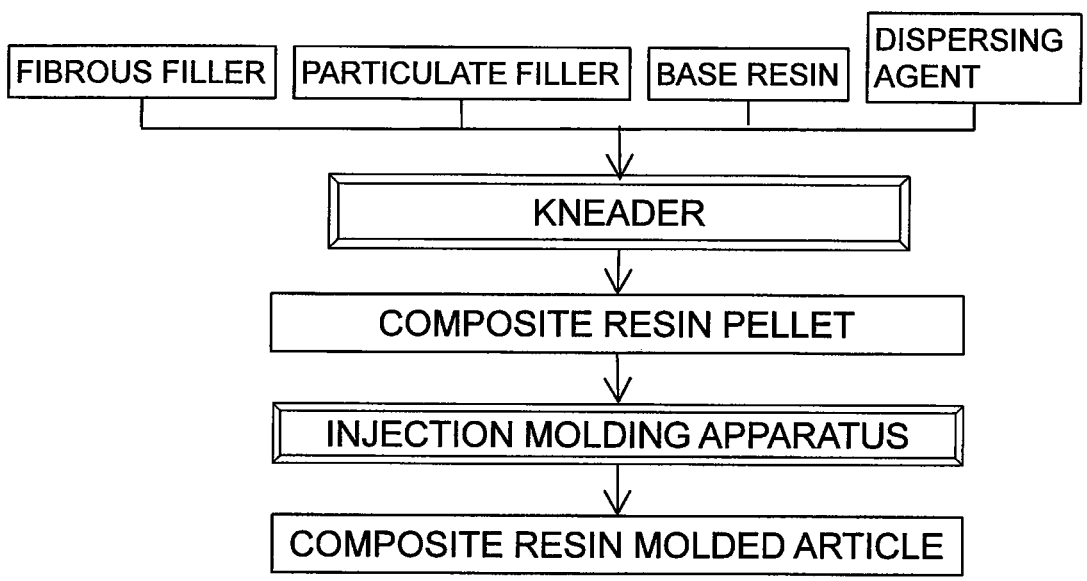
FIG. 3 is a schematic diagram of a production process for the composite resin molded article in the first embodiment.
Figure 5:
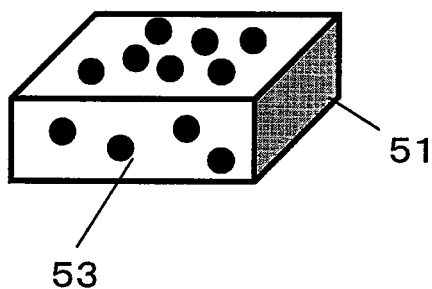
FIG. 5 is a schematic sectional drawing of a composite resin molded article in Japanese Patent No. 3500403.

Next, a production method will be described. FIG. 3 is a flow chart illustrating the production process for the composite resin molded article in the first embodiment.

(1) A base resin, fibrous fillers also including particulate fillers, and if necessary, a dispersant are put into the melt-kneading apparatus, and melt-kneaded in the apparatus. Thereby, the base resin is melted, and the fibrous fillers and the dispersant are dispersed in the melted base resin. At the same time, the shearing action of the device promotes defibration of an aggregate of the fibrous fillers, and the fibrous fillers can be finely dispersed in the base resin.

Conventionally, fibrous fillers and particulate fillers obtained by previously defibrating fibers through a pretreatment such as wet dispersion have been used. However, if the fibrous fillers are previously defibrated in a solvent used in the wet dispersion, the fillers are more likely to be defibrated than in the melted base resin, and therefore it is difficult to defibrate only the end part, resulting in a state that the entire fibrous filler is defibrated. In addition, there have been problems that the number of processes is increased by adding the pretreatment, and the productivity is deteriorated.

In contrast, in the production process of the composite resin molded article in the present embodiment, the fillers are melt-kneaded together with the base resin, the dispersant and the like (all-dry process) without the pretreatment by wet dispersion intended to defibrate and modify the fibrous fillers and particulate fillers. In this process, the wet dispersion treatment of the fibrous filler is not carried out, so that the fibrous filler can be partially defibrated only at the end part as described above, furthermore the number of processes is small, and the productivity can be improved.

For preparing the fiber in the form according to the present disclosure by the all-dry process, it is preferable to apply a high shearig stress during kneading. Specific examples of the kneading implement include a single-screw kneader, a twin-screw kneader, a roll kneader, a Banbury mixer, a combination thereof, and the like. A continuous twin-screw kneader and a continuous roll kneader are particularly preferable from the viewpoints of easy application of high shear and a high mass productivity. A kneading implement other than the aforementioned implements may be used as long as the implement can apply a high shear stress.

(2) The composite resin molded article extruded from the melt-kneading apparatus is formed into a pellet shape through a cutting process using a pelletizer or the like. Examples of the pelletization method include an in-air hot cut method, an in-water hot cut method, a strand cut method, and the like, which are carried out immediately after the resin melting. Alternatively, a pulverization method, in which after once a molded article or a sheet is formed, the molded article or the sheet is pulverized and cut, and the like is also included.

This pellet is injection-molded, and thereby an injection-molded article as the composite resin molded article can be prepared. When the fibrous fillers and the particulate fillers in the pellet are mixed as described above, an injection-molded article excellent in elastic modulus, impact resistance and appearance can be obtained. Hereinafter, each example and each comparative example in experiments carried out by the inventors will be explained.

Example 1

A pulp-dispersed polypropylene composite resin molded article was produced by the following production method.

As a starting material for the fibrous fillers and particulate fillers, a coniferous pulp (trade name: NBKP Celgar, manufactured by Mitsubishi Paper Mills Limited.) was used. The coniferous pulp was pulverized by a pulverizer to obtain a mixture of the fibrous fillers and the particulate fillers. An aspect ratio of each filler was adjusted in the pulverization process. A polypropylene as a base resin (trade name: J108M, manufactured by Prime Polymer Co., Ltd.), a mixture of the fibrous fillers and particulate fillers, and a maleic anhydride as a dispersant (trade name: UMEX, manufactured by Sanyo Chemical Industries, Ltd.) were weighed out so that a weight ratio was 85:15:5, and they were dry-blended. Subsequently, the mixture was melt-kneaded and dispersed by a twin-screw kneader (KRC kneader manufactured by Kurimoto, Ltd.). The shearing force can be changed by changing the configuration of the screw in the twin-screw kneader. The specification in example 1 was of the medium shear type. The resin melt was thermally cut to prepare a pulp-dispersed polypropylene pellet.

A test piece of the composite resin molded article was produced by an injection molding machine (180AD, manufactured by THE JAPAN STEEL WORKS, LTD.) using the prepared pulp-dispersed polypropylene pellet. In the condition for preparing the test piece, a resin temperature was 190° C., a mold temperature was 60° C., an injection speed was 60 mm/s, and a follow-up pressure was 80 MPa. The shape of the test piece was changed depending on evaluation items described below, a No. 1-size dumbbell-shaped test piece was prepared for measuring an elastic modulus, and a 60 mm square flat plate having a thickness of 1.6 mm was prepared for testing the drop impact and checking the appearance. In addition, in order to evaluate the colorability, the composite resin molded article of the flat plate was prepared by dry-blending the colorant during molding. The test piece of the obtained pulp-dispersed polypropylene composite resin molded article was evaluated by the following method.

(Aspect Ratio and End Defibrating Property of Fiber)

The obtained pulp-dispersed polypropylene pellet was immersed in a xylene solvent to dissolve the polypropylene, and shapes of remaining pulp fibers were observed by SEM. About 50 representative fibers were measured at five sites of each fiber, and as a result, a percentage of the fibers having aspect ratios of 10 or higher was 5 to 10%, and a percentage of the fibers having aspect ratios of 2 or lower was 50 to 60%. The end parts of the fibers were in a defibrated state.

(Color Difference L Value of Fiber)

Pulp fibers were put into a cup up to a full level, the top of the cup was flattened, the color difference was measured using a color-difference meter (Chroma Meter CR-400, manufactured by KONICA MINOLTA JAPAN, INC.). As a scale of whiteness, lightness of L value was used. The L value was 90.

(Aspect Ratios of Fibers at Surface Layer Side and Core Side of Resin, and Color Difference L Values)

The surface layer side and the core side of the composite resin molded article were separated from each other by cutting, and each fiber aspect ratio and each color difference L value were compared as described above. The aspect ratios of the fibers at the surface layer side were higher than at the core side. The color difference L value at the surface layer side was higher than at the core side.

(Elastic Modulus of Composite Resin Molded Article)

A tensile test was performed using the obtained No. 1 dumbbell-shaped test piece. Herein, as a method for evaluating an elastic modulus, a value of lower than 1.7 GPa was expressed as "Bad", a value of 1.7 GPa or higher and lower than 2.1 GPa was expressed as "Middling", and a value of 2.1 GPa or higher was expressed as "Good". The test piece had an elastic modulus of 2.2 GPa, and was rated as "Good".

(Result of Drop Test of Composite Resin Molded Article)

A drop impact test was carried out using the obtained flat test piece. Specifically, 250 g of plumb bob was dropped from a height of 80 cm to the plate surface of the test piece, and it was confirmed whether a crack was generated. In this evaluation method, a test piece showing no crack was expressed as "Good", a test piece showing a crack having a length of shorter than 10 mm only on a surface was expressed as "Middling", a test piece showing a through crack or a crack having a length of 10 mm or longer was expressed as "Bad". The test piece did not show any crack, and was rated as "Good".

(Colorability of Composite Resin Molded Article)

In production, the composite resin molded article was molded while adding a white colorant, and a sensory evaluation was carried out for colorability such as coloring uniformity and color unevenness. A test piece showing no color unevenness and uniformly colored into white was expressed as "Good", a test piece showing partial color unevenness at a level of 1 cm$^2$ or smaller in area was expressed as "Middling", and a test piece showing color unevenness at a level of larger than 1 cm$^2$ in area or showing no white coloring was expressed as "Bad". The test piece was able to be colored without color unevenness, and rated as "Good".

(Appearance of Composite Resin Molded Article)

A sensory evaluation was carried out to determine whether the composite resin molded article showed fiber aggregates as white spots at a visible level. A composite resin molded article showing no white spot was expressed as "Good", a composite resin molded article showing a white spot having a long side length of 2 mm or shorter was expressed as "Middling", and a composite resin molded article showing a white spot having a long side length of longer than 2 mm was expressed as "Bad". The test piece showed no white spot, and was rated as "Good".

Example 2

In example 2, a pulp-dispersed polypropylene pellet and a composite resin molded article were prepared in the same material condition and process condition as in example 1 except that a period of pulverizing the pulp was slightly lengthened. Evaluation was carried out in the same manner as in example 1.

Example 3

In example 3, the pulp was pulverized, then fibers having high aspect ratios were removed by a sieve, and only fibers having low aspect ratios were used. Other material conditions and process conditions were set the same as in example 1 to prepare a pulp-dispersed polypropylene pellet and a composite resin molded article. Evaluation was carried out in the same manner as in example 1.

Comparative Example 1

In comparative example 1, a period of pulverizing the pulp was shortened, and other material conditions and process conditions were set the same as in example 1 to prepare a pulp-dispersed polypropylene pellet and a composite resin molded article. Evaluation was carried out in the same manner as in example 1.

Comparative Example 2

In comparative example 2, a period of pulverizing the pulp was considerably lengthened, and other material conditions and process conditions were set the same as in example 1 to prepare a pulp-dispersed polypropylene pellet and a composite resin molded article. Evaluation was carried out in the same manner as in example 1.

Comparative Example 3

In comparative example 3, a pulp-dispersed polypropylene pellet and a composite resin molded article were prepared in the same material condition and process condition as in example 1 except that the pulp was not pulverized. Evaluation was carried out in the same manner as in example 1.

Comparative Example 4

In comparative example 4, a period of pulverizing the pulp was considerably lengthened, furthermore fibers having high aspect ratios were removed by a sieve, and only fibers having low aspect ratios were used. Other material conditions and process conditions were set the same as in example 1 to prepare a pulp-dispersed polypropylene pellet and a composite resin molded article. Evaluation was carried out in the same manner as in example 1.

Comparative Example 5

In comparative example 5, the mold temperature in molding was set to 120° C., and the resin was slowly cooled, so that fibers having large aspect ratios flowed inward. Other material conditions and process conditions were set the same as in example 1 to prepare a pulp-dispersed polypropylene pellet and a composite resin molded article. Evaluation was carried out in the same manner as in example 1.

Comparative Example 6

In comparative example 6, the lot of the coniferous pulp was changed to a fiber having low whiteness with lightness of L value of 70. Other material conditions and process conditions were set the same as in example 1 to prepare a pulp-dispersed polypropylene pellet and a composite resin molded article. Evaluation was carried out in the same manner as in example 1.

Comparative Example 7

In comparative example 7, the composite resin molded article was prepared, then the composite resin molded article was heat-treated at about 140° C. for about 1 hours to increase a degree of carbonization at the surface layer side and decrease lightness of L value at the surface layer side. Other material conditions and process conditions were set the same as in example 1 to prepare a pulp-dispersed polypropylene pellet and a composite resin molded article. Evaluation was carried out in the same manner as in example 1.

Comparative Example 8

In comparative example 8, a low shear type kneader was used to prevent defibration of the fibers. Other material conditions and process conditions were set the same as in example 1 to prepare a pulp-dispersed polypropylene pellet and a composite resin molded article. Evaluation was carried out in the same manner as in example 1.

The table of FIG. 4 shows measurement results in examples 1 to 3 and comparative examples 1 to 8.

As apparent from the table of FIG. 4, in example 2 in which the period of pulverizing the pulp was slightly lengthened, a percentage of the fibers having aspect ratios of 2 or lower was slightly increased to 60 to 70%. In example 3 in which the pulp was pulverized, then the fibers having high aspect ratios were removed by the sieve, and only fibers having low aspect ratios were used, a percentage of the fibers having aspect ratios of 10 or higher was decreased to 0 to 5%. In examples 2 and 3, the percentage of the fibers having high aspect ratios was slightly reduced, and thus the elastic modulus was slightly reduced to 2.1 GPa, but there was no problem, and it was also confirmed that there was no problem in impact strength, colorability and appearance. It was confirmed that a highly reinforced resin could be obtained as long as an abundance ratio of fibers having aspect ratios of 10 or higher was 1% to 10%, an abundance ratio of fibers having aspect ratios of 2 or lower was 50% to 70%, a large number of fibers having high aspect ratios of 10 or higher were charged at the surface layer of the composite resin molded article, and small fibers having aspect ratios of 2 or lower were charged at the core side of the composite resin molded article.

In comparative example 1 in which the period of pulverizing the pulp was shortened, pulverization of the fibers did not progress so much, thus the percentage of the fibers having aspect ratios of 10 or higher was 15 to 30%, the percentage of the fibers having aspect ratios of 2 or lower was 35 to 45%. As a result, the elastic modulus was slightly increased, but the impact resistance was lowered, and the composite resin molded article was broken in the drop impact test. In addition, white spots were observed in the composite resin molded article when the fibers having high aspect ratios aggregated.

In comparative example 2 in which the period of pulverizing the pulp was considerably lengthened, pulverization of the fibers progressed well, the percentage of the fibers having aspect ratios of 10 or higher was 1 to 5%, the percentage of the fibers having aspect ratios of 2 or lower was 75 to 85%. As a result, the amount of fibers having low aspect ratios was increased, and thus the elastic modulus was decreased to 1.8 GPa.

In comparative example 3 in which the pulp was not pulverized, the percentage of the fibers having aspect ratios of 10 or higher was 80 to 90%, and the percentage of the fibers having aspect ratios of 2 or lower was 0 to 5%. As a result, the elastic modulus was slightly increased, but the impact resistance was lowered, and the composite resin molded article was broken in the drop impact test. In addition, white spots were observed in the composite resin molded article when the fibers having high aspect ratios aggregated.

In example 4 in which the period of pulverizing the pulp was considerably lengthened, furthermore the fibers having high aspect ratios were removed by a sieve and only fibers having low aspect ratios were used, the percentage of the fibers having aspect ratios of 10 or higher was 0%, and the percentage of the fibers having aspect ratios of 2 or lower was 80 to 90%. As a result, there were only fibers having low aspect ratios, and therefore the elastic modulus was significantly decreased to 1.6 GPa.

In comparative example 5 in which the mold temperature in molding was set to 120° C., and the resin was slowly cooled so that the fibers having high aspect ratios flowed inward, the aspect ratios of the fibers in the composite resin molded article were expressed by an equation: aspect ratio at the core side aspect ratio at the surface layer side. As a result, the elastic modulus was slightly decreased to 2.0 GPa, and also the impact resistance was slightly deteriorated.

In comparative example 6 in which the lot of the coniferous pulp was changed to a fiber having low whiteness with lightness of L value of 70, the composite resin molded article was not able to be uniformly colored because of the low whiteness of the fibers, resulting in color unevenness.

In comparative example 7 in which the composite resin molded article was prepared, then the composite resin molded article was heat-treated at about 140° C. for about 1 hours to increase the degree of carbonization at the surface layer side and decrease lightness of the L value at the surface layer side, the color difference L values of the resin in the composite resin molded article were expressed by an equation: lightness of L value at the core side lightness of L value at the surface layer side. As a result, the colorability was slightly deteriorated, and at the same time, the color unevenness due to white spots was also slightly deteriorated.

In comparative example 8 in which a low shear type kneader was used to prevent defibration of the fibers, the fibers were not defibrated so much in the composite resin molded article, and there were no fibers having defibrated end parts. As a result, the elastic modulus was slightly decreased to 2.0 GPa, and furthermore the impact resistance was also slightly deteriorated.

From the above evaluations, an abundance ratio of the fibers having aspect ratios of 10 or higher is 1% to 10% of the fibers added in the composite resin molded body, and an abundance ratio of the fibers having aspect ratios of 2 or lower is 50% to 70%. A large number of fibers having high aspect ratios of 10 or higher are charged at the surface layer of the composite resin molded article, and fibers having aspect ratios of 2 or lower are charged at the core side of the composite resin molded article, so that both a high elastic modulus and a high impact strength can be achieved, and furthermore a composite resin molded article having a good appearance without fiber aggregates can be obtained. In addition, a high elastic modulus can be achieved even if the aspect ratio is not so high, by preparing a composite resin molded article using a resin material in which only at least one end part of each fiber is defibrated. Furthermore, it was found that uniform colorability could be provided by making lightness of the L value at the surface layer side higher than lightness of the L value at the core side in the composite resin molded article using fibers having high whiteness with a color difference L value of 80 or higher.

Note that the present disclosure includes appropriate combinations of any embodiments and/or examples from the aforementioned various embodiments and/or examples, and in the present disclosure, the effect of each embodiment and/or example can be exhibited.

The composite resin molded article according to the present disclosure makes it possible to provide a composite resin molded article having a mechanical strength superior to that of the conventional general-purpose resin. Since the present disclosure makes it possible to improve the properties of the base resin, the composite resin molded article can be used as an alternative for an engineering plastic or as an alternative for a metallic material. Consequently, a manufacturing cost for various industrial products made of engineering plastics or metals, or livingwares can be significantly reduced. Furthermore, the composite resin molded article can be used for home appliance housings, building materials, and automobile parts.

REFERENCE SIGNS LIST

1 Base resin
2 Fibrous filler (Filler)
3 Particulate filler (Filler)
4 Defibrated part
10 Composite resin molded article
51 Resin
53 Cellulose-based powder

What is claimed is:

1. A composite resin molded article containing:
a base resin; and
fillers dispersed in the base resin,
wherein the fillers include fibrous fillers having aspect ratios of 10 or higher, and particulate fillers having aspect ratios of 2 or lower,
wherein a ratio of the fibrous fillers in the fillers ranges from 1% to 10%, and a ratio of the particulate fillers in the fillers ranges from 50% to 70%, and
wherein a ratio of other fibers having aspect ratios of higher than 2 and lower than 10 in the fillers is 20% to 49%.

2. The composite resin molded article according to claim 1, wherein a ratio of the fibrous fillers in the fillers present at a surface layer of the composite resin molded article is higher than a ratio of the fibrous fillers in the fillers present at a core side of the composite resin molded article.

3. The composite resin molded article according to claim 1, wherein the fillers have lightness of L values of higher than 80 determined by a color difference measurement.

4. The composite resin molded article according to claim 1, wherein the composite resin molded article has lightness of different L values determined by a color difference measurement in a cross-sectional direction, wherein the lightness of L values at a surface layer of the composite resin molded article are higher than the lightness of L values at a core side of the composite resin molded article.

5. The composite resin molded article according to claim 1, wherein at least one end part of each fibrous filler in the composite resin molded article is defibrated.

6. The composite resin molded article according to claim 1, wherein the fillers are composed of natural fibers.

7. The composite resin molded article according to claim 1, wherein the base resin is composed of an olefin resin.

* * * * *

UNITED STATES PATENT AND TRADEMARK OFFICE
CERTIFICATE OF CORRECTION

| | | |
|---|---|---|
| PATENT NO. | : 12,305,026 B2 | Page 1 of 1 |
| APPLICATION NO. | : 16/532675 | |
| DATED | : May 20, 2025 | |
| INVENTOR(S) | : Masashi Hamabe et al. | |

It is certified that error appears in the above-identified patent and that said Letters Patent is hereby corrected as shown below:

On the Title Page

In item (73), please delete "Panasonic Corporation", and add --Panasonic Holdings Corporation--.

Signed and Sealed this
Fifteenth Day of July, 2025

Coke Morgan Stewart
*Acting Director of the United States Patent and Trademark Office*